United States Patent [19]

Veri

[11] 4,169,165
[45] Sep. 25, 1979

[54] PRODUCTION OF DICED HOT BANANA PEPPERS

[76] Inventor: Victor J. Veri, 70 Jerome Crescent, Hamilton, Ontario, Canada

[21] Appl. No.: 898,393

[22] Filed: Apr. 20, 1978

[51] Int. Cl.² .................... A23L 1/212; A23L 1/218
[52] U.S. Cl. .................... 426/615; 426/484; 426/518
[58] Field of Search ............ 426/615, 627, 478, 479, 426/484, 518, 654

[56] References Cited

U.S. PATENT DOCUMENTS

| | | | |
|---|---|---|---|
| 2,587,466 | 2/1952 | Harris | 426/615 |
| 2,863,482 | 12/1958 | Keifer | 426/484 |
| 3,057,738 | 10/1962 | Forkner | 426/615 |
| 4,002,774 | 1/1977 | Chan, Jr. | 426/484 |

*Primary Examiner*—Raymond N. Jones
*Assistant Examiner*—Elizabeth A. Hatcher

[57] ABSTRACT

A process is described for preparing diced hot banana peppers which avoids the usual manual procedures of slicing and removing seeds and pulp. According to the novel method, stems are removed and the peppers are washed in the usual manner, but these washed papers are then passed directly through a commercial dicing machine to produce a diced mass of material including diced vegetable flesh, pulp and seeds. This diced mass is then fed in one end of a cylindrical revolving screen sizer wherein the seeds and pulp are separated from the diced vegetable flesh by passing through the screen to waste while the diced vegetable flesh remains on the screen. The diced vegetable flesh substantially free of the undesirable pulp and seeds is then collected from the screen and can be directly frozen or pickled for use by the consumer.

5 Claims, 2 Drawing Figures

PRODUCTION OF DICED HOT BANANA PEPPERS

BACKGROUND OF THE INVENTION

1. Field of the Invention

This invention relates to a process for the preparation of diced hot banana peppers and, particularly, to a process which does not require manual steps.

2. Description of the Prior Art

A wide variety of garden peppers are used in foods and their popularity is on the increase. Such peppers generally belong to the genus Capsicum and the present application is particularly concerned with a long variety of hot peppers generally known as "hot banana peppers". As commonly found in stores and in the institutional trades, these hot banana peppers are in the form of whole peppers with the core and seeds still present therein. These whole peppers can be stored by pickling, but cannot be frozen because the pulp and seeds blacken when frozen.

A problem that has been encountered with the hot banana peppers is that they have not been amenable to mechanical processing. Thus, in order to remove the undesirable seeds and interior pulp, it has been necessary to manually cut the peppers and remove the central portions including the seeds and pulp by hand.

At the same time, with the widespread use of these peppers in various foods and the great demand for them in a convenient form, there has been a great interest in a means for providing hot banana peppers in a diced form. Such diced peppers could be sold in the form of a diced pickle or as frozen diced peppers.

It is, therefore, the object of the present invention to provide a convenient commercial procedure for the production of diced hot banana peppers directly from whole peppers without the need for manual preparation.

SUMMARY OF THE INVENTION

Thus, the present invention provides a process for preparing diced hot banana peppers which comprises the steps of removing the stems from the peppers and washing them in the usual manner and then passing the washed peppers through a commercial dicing machine to produce a diced mass of material including diced vegetable flesh, pulp and seeds. This diced mass is then passed into one end of a cylindrical revolving screen sizer in which the seeds and pulp are separated from the diced vegetable flesh by passing through the screen to waste while the diced vegetable flesh remains on the screen to be collected at the opposite end of the revolving screen sizer.

In view of the difficulties normally encountered in the separation of the pulpy fibrous material and seeds from the interior of a pepper, it was not to be expected that the pulpy component would be sufficiently separated from the fleshy component by means of dicing such that the pulpy material would pass through a screen together with the seeds while leaving the diced pepper pieces on the screen. It was even more surprising that this operation could be carried out by the present procedure while leaving the diced pepper pieces substantially intact.

Excellent results were achieved using a sizing screen having a mesh size of about ¼ to ½ inch.

DESCRIPTION OF THE PREFERRED EMBODIMENTS

In the drawings which illustrate the invention,

Figure 1:
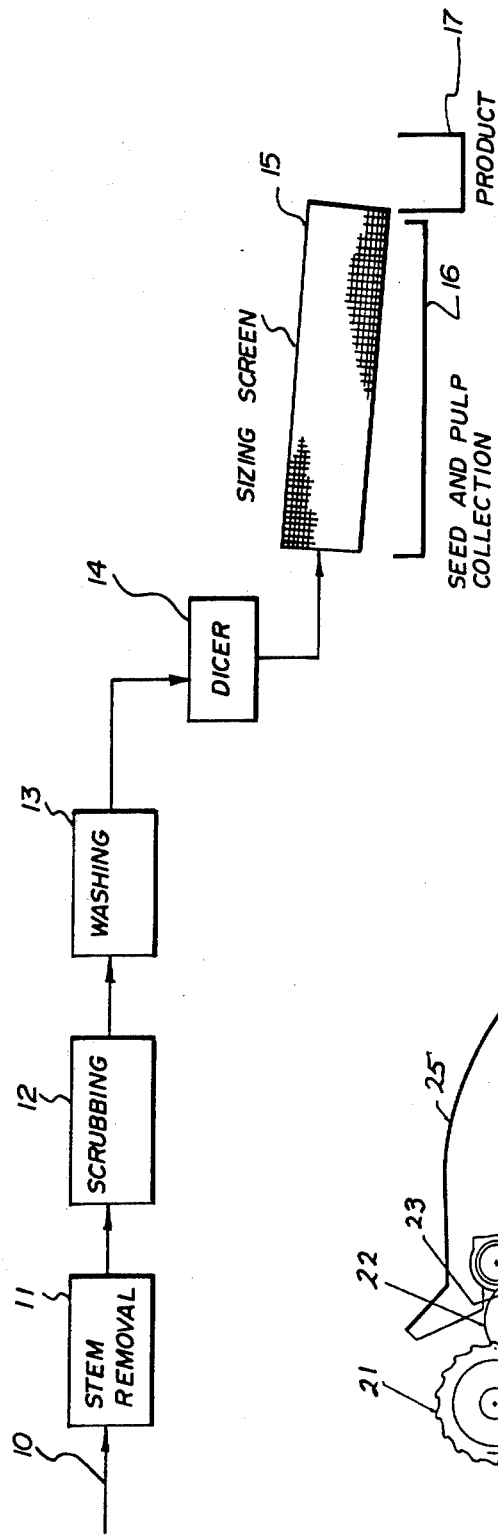
FIG. 1 is a schematic illustration of the procedure in block form.

The various individual steps in sequence are shown in block form since each step within itself is a known individual step within the field of vegetable processing. Thus, looking at FIG. 1, a supply of hot banana peppers 10 are passed through a stem removal station 11 for stem removal. After the stem removal the peppers pass through a scrubber where the surfaces are scrubbed by means of brushes and these scrubbed peppers are given a final washing in the washing stage 13. These washed peppers are then fed into a dicer 14 and this can be a usual vegetable dicing machine such as an Urschel® model J dicing machine. The material emerging from the dicing machine 14 is then passed directly into a rotating sizing screen 15 having a mesh size of about ¼ to ⅜ inch and a length of about 10 feet. During the passage of the material through the rotating screen 15, the pulp and seeds pass through the screen and drop down onto the seed and pulp collector 16. Diced pepper material substantially free of either seeds or pulp is discharged from the opposite end of the rotating screen 15 and is collected in product receiver 17.

The diced hot banana peppers collected at 17 are then either bottled and pickled in the usual manner of a pickled vegetable or are directly passed to a freezing tunnel for fast freezing and packaging. The pickled hot banana peppers are used for addition to a wide variety of foods in the home while the frozen peppers are intended primarily for use in the production of pizzas.

A convenient form of dicer is one of the type which completely flattens the peppers and then cuts squares from them. This produces a minimum of chips and cuts the fleshy component of the peppers into diced portions of very uniform size. The uniform size of the diced portions is essential for efficient separation of the diced material from the seeds and pulp in the rotating screen.

It is also advantageous if the dicer is of the type in which the flattened peppers are cut into long strips by rotating circular knives and these long strips are then cut into squares by cross cut knives. These cross cut knives are preferably mounted on a spindle rotating at high speeds such that the squares cut from the long strips are thrown by the rotating blades. The squares are preferably thrown upwardly and outwardly against a discharge chute and the impact of the rotating blades with the long strips as well as the impact of the squares on the chute is very effective in helping to loosen the pulp and seeds from the cut squares. The result is a very clean separation in the rotating screen.

Figure 2:
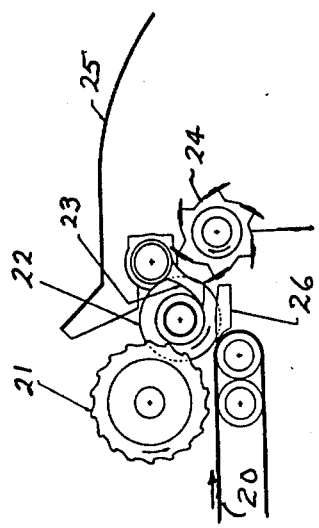
FIG. 2 is a sectional elevation of a dicer.

A particularly preferred form of dicer is shown in FIG. 2 and includes a high speed conveyor belt 20 which carries the peppers to the cutting parts. A feed roll 21 is mounted directly over the end of the conveyor belt. This feed roll serves two purposes. It flattens the peppers before entering the knives and it forces the peppers into the knives. The feed roll 21 meshes into circular knives 22, causing a positive transfer of the peppers to the knives. These circular knives 22 cut the peppers into strips as they move across stationary feed plate 26.

The cut strips are removed from circular knives 22 by means of a shear plate 23 which also acts as a cutting block for cross cut knives 24. As shown, the cross cut knives 24 are mounted on the periphery of a spindle which rotates counter clockwise, preferably at a speed in the order of at least 2000 r.p.m. Thus, as the long strips of peppers are ejected from the circular knives 22, these strips are cut into square by the cross cut knives 24 and thrown into discharge chute 25.

The embodiments of the invention in which an exclusive property or privilege is claimed are defined as follows:

1. A process for preparing diced hot banana peppers which comprises removing the stems and washing said peppers, flattening said peppers, cutting said flattened peppers into strips by means of rotating circular blades, cutting said strips into squares by means of cross cut knives mounted on a rotating spindle which is rotating at high speeds, said cross cut knives throwing the cut squares upwardly and outwardly against a discharge chute with the impact of the rotating blades against the long strips and the impact of the squares on the chute serving to loosen the pulp and seeds from the cut squares, to thereby obtain a diced mass of pepper material comprising diced flesh, pulp and seeds, passing said diced mass in one end of a cylindrical revolving screen sizer whereby the seeds and pulp are separated from the diced flesh by passing through the screen to waste while the diced flesh remains on the screen and collecting diced hot banana pepper from the screen substantially free from seeds and pulp.

2. The process according to claim 1 wherein the sizing screen has a mesh size of about $\frac{1}{4}$" to $\frac{1}{2}$".

3. The process according to claim 1 wherein the diced peppers collected from the screen are frozen and packaged.

4. The process according to claim 1 wherein the diced peppers collected from the screen are pickled.

5. The process according to claim 1 wherein said spindle rotates at a speed of at least about 2000 r.p.m.

* * * * *